United States Patent
Lee (10) Patent No.: US 10,069,386 B2
(45) Date of Patent: Sep. 4, 2018

(54) SUPPORT APPARATUS FOR GUIDE PIN

(71) Applicant: Ming-Chang Lee, Taipei (TW)

(72) Inventor: Ming-Chang Lee, Taipei (TW)

( * ) Notice: Subject to any disclaimer, the term of this patent is extended or adjusted under 35 U.S.C. 154(b) by 291 days.

(21) Appl. No.: 15/065,891

(22) Filed: Mar. 10, 2016

(65) Prior Publication Data

US 2017/0264174 A1    Sep. 14, 2017

(51) Int. Cl.
*H02K 15/09* (2006.01)
*H02K 15/095* (2006.01)

(52) U.S. Cl.
CPC .................. *H02K 15/095* (2013.01)

(58) Field of Classification Search
CPC ..................................... H02K 15/095
USPC ......................................... 254/390
See application file for complete search history.

(56) References Cited

U.S. PATENT DOCUMENTS

| | | | | |
|---|---|---|---|---|
| 1,494,040 A | * | 5/1924 | Thompson ................ | B60S 5/04 137/355.21 |
| 3,081,043 A | * | 3/1963 | Morrill ................ | H02K 15/095 242/432.4 |
| 5,255,776 A | * | 10/1993 | Grecksch ............... | B65H 67/02 198/465.1 |
| 2010/0301154 A1 | * | 12/2010 | Mugelli ............. | H02K 15/0075 242/432.2 |
| 2012/0228421 A1 | * | 9/2012 | Heffelfinger ......... | H02K 15/095 242/432.5 |
| 2017/0229947 A1 | * | 8/2017 | Parati ................... | H02K 15/095 |

* cited by examiner

*Primary Examiner* — Michael E Gallion (57) ABSTRACT

A support apparatus for a guide pin contains: an accommodation tube, an upright post, a connection shaft, a holder, two side plates, a guiding trench, a roller, a guide pin, and a driving mechanism. The accommodation tube includes a fork, a through groove, and an elongated slot. The upright post includes two first coupling segments, and the connection shaft passes through the fork and is located on the accommodation tube. The holder includes two parallel joining extensions, and the two side plates are separated from each other. The guiding trench passes through the holder, and the roller is accommodated between the two side plates and is rotatably fitted with the connection shaft, and a part of the guide pin inserts into the guiding trench. The driving mechanism is accommodated in the elongated slot and is in connection with the two first coupling segments and the two joining extensions.

5 Claims, 11 Drawing Sheets

SUPPORT APPARATUS FOR GUIDE PIN

FIELD OF THE INVENTION

The present invention relates to a support apparatus for a guide pin which is simplified and is manufactured at low cost.

BACKGROUND OF THE INVENTION

A conventional motor contains a stator in/on which a plurality of wire winding sets are arranged, wherein when each wire winding set is arranged on the stator, the stator is called as an external stator, and when said each wire winding set is fixed in the stator, the stator is called as an internal stator.

Said each wire winding set winds a metal wire on the stator vertically, but such a wire winding manner is complicated and spends a lot of assembly cost.

The present invention has arisen to mitigate and/or obviate the afore-described disadvantages.

SUMMARY OF THE INVENTION

The primary objective of the present invention is to provide a support apparatus for a guide pin which is simplified and is manufactured at low cost.

To obtain above-mentioned objective, a support apparatus for a guide pin provided by the present invention contains: an accommodation tube, an upright post, a connection shaft, a holder, two side plates, a guiding trench, a roller, a guide pin, and a driving mechanism.

The accommodation tube includes a fork extending outwardly from a bottom thereof, a through groove formed in a central position thereof and communicating with the fork, and an elongated slot defined in the through groove and communicating with the fork.

The upright post includes two first coupling segments extending outwardly from a bottom thereof and moving in the accommodation tube.

The connection shaft passes through the fork and is located on a first peripheral side of the accommodation tube opposite to a second peripheral side of the accommodation tube on which the elongated slot is defined.

The holder includes two parallel joining extensions extending outwardly from a top thereof.

The two side plates are separated from each other and accommodate the connection shaft, such that the holder moves longitudinally and horizontally along the connection shaft relative to the accommodation tube.

The guiding trench passes through two sides of the holder.

The roller is accommodated between the two side plates and rotatably fitted with the connection shaft.

A part of the guide pin inserts into the guiding trench of the holder.

The driving mechanism is accommodated and moves in the elongated slot, wherein the driving mechanism is in connection with the two first coupling segments of the upright post and with the two joining extensions of the holder so as to drive the holder to move longitudinally and horizontally relative to the accommodation tube by way of the upright post.

DETAILED DESCRIPTION OF THE PREFERRED EMBODIMENTS

Figure 1:
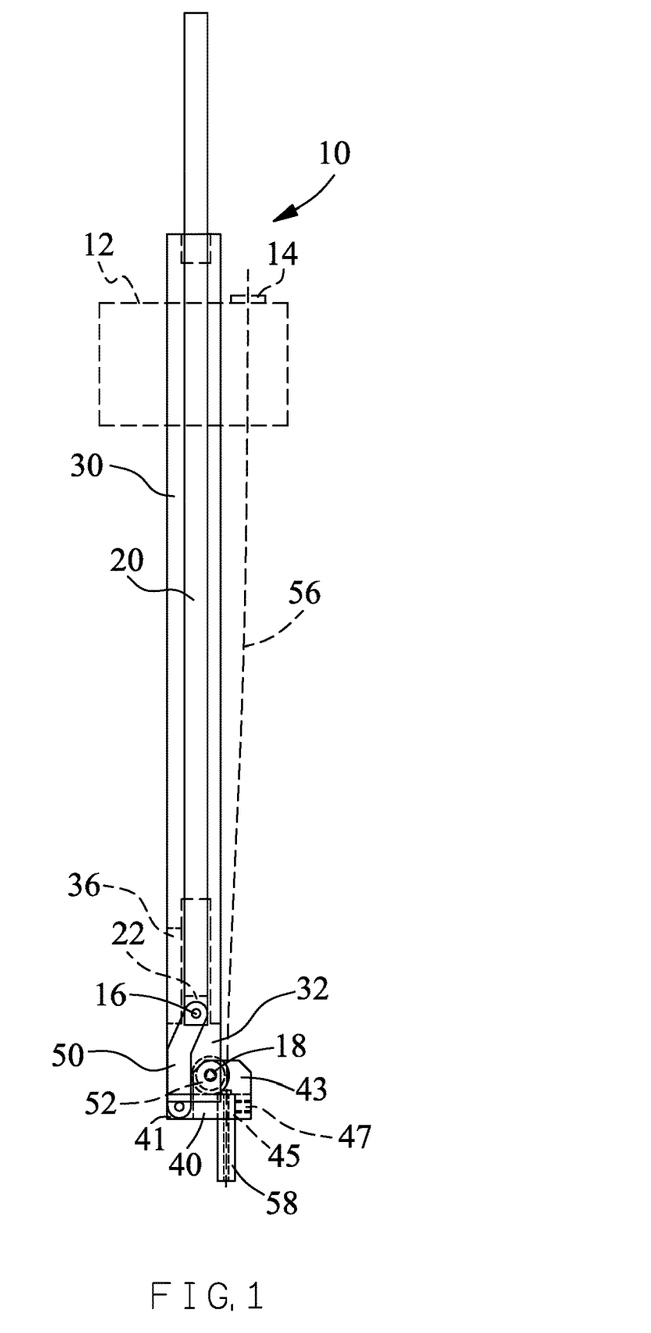
FIG. 1 is a side plan view showing the assembly of a support apparatus for a guide pin according to a preferred embodiment of the present invention.

With reference to FIG. 1, a support apparatus 10 for a guide pin according to a preferred embodiment of the present invention comprises: a connection shaft 18, an upright post 20, an accommodation tube 30, a holder 40, a driving mechanism 50, a roller 52, and a guide pin 58.

Referring to FIGS. 1 and 4 to 6, the accommodation tube 30 includes a fork 32 extending outwardly from a bottom thereof, two opposite orifices 38 defined on two sides of the fork 32, and a through groove 34 formed in a central position thereof and having different diameters, wherein the through groove 34 is in communication with the fork 32. The accommodation tube 30 further includes an elongated slot 36 defined in the through groove 34 and communicating with the fork 32.

The connection shaft 18 passes through the two opposite orifices 38 of the fork 32 and is located on a first peripheral side of the accommodation tube 30 opposite to a second peripheral side of the accommodation tube 30 on which the elongated slot 36 is defined.

Figure 2:
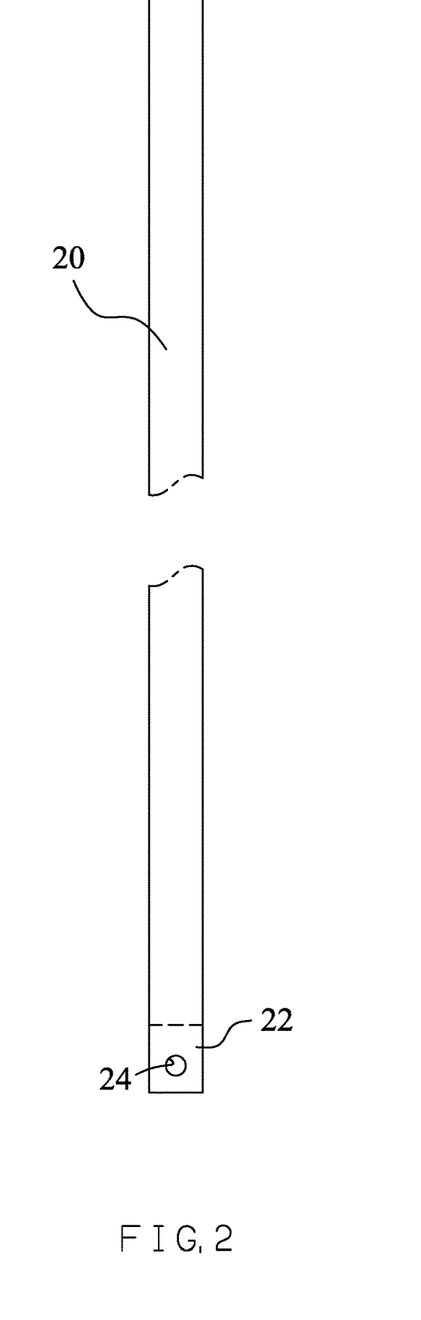
FIG. 2 is a side plan view showing the assembly of an upright post of the support apparatus for the guide pin according to the preferred embodiment of the present invention.
Figure 3:
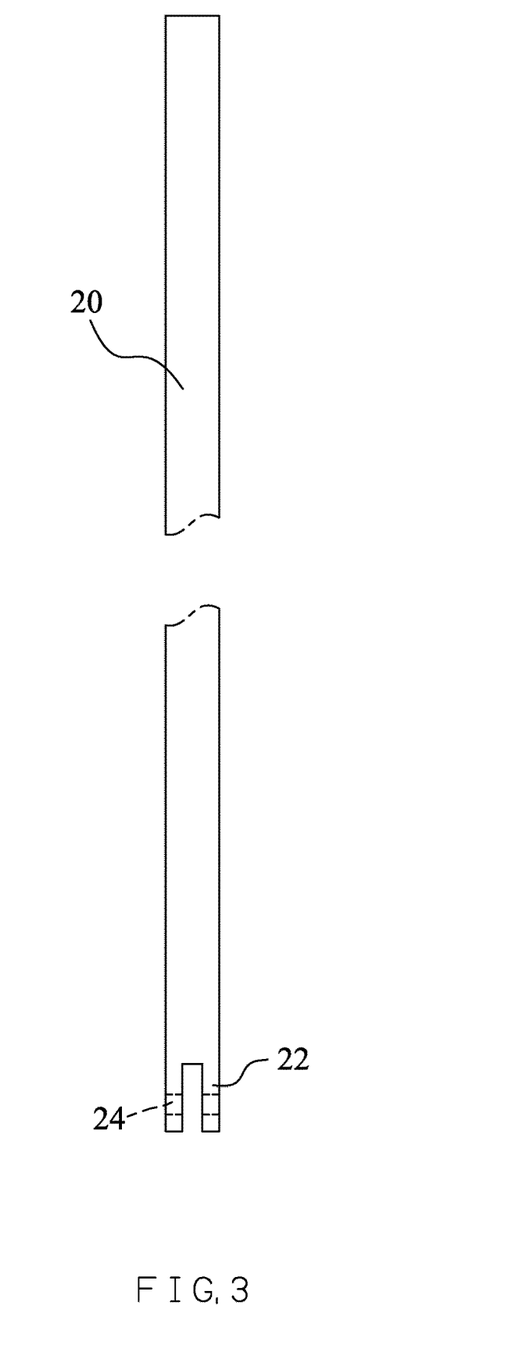
FIG. 3 is another side plan view showing the assembly of the upright post of the support apparatus for the guide pin according to the preferred embodiment of the present invention.
Figure 4:
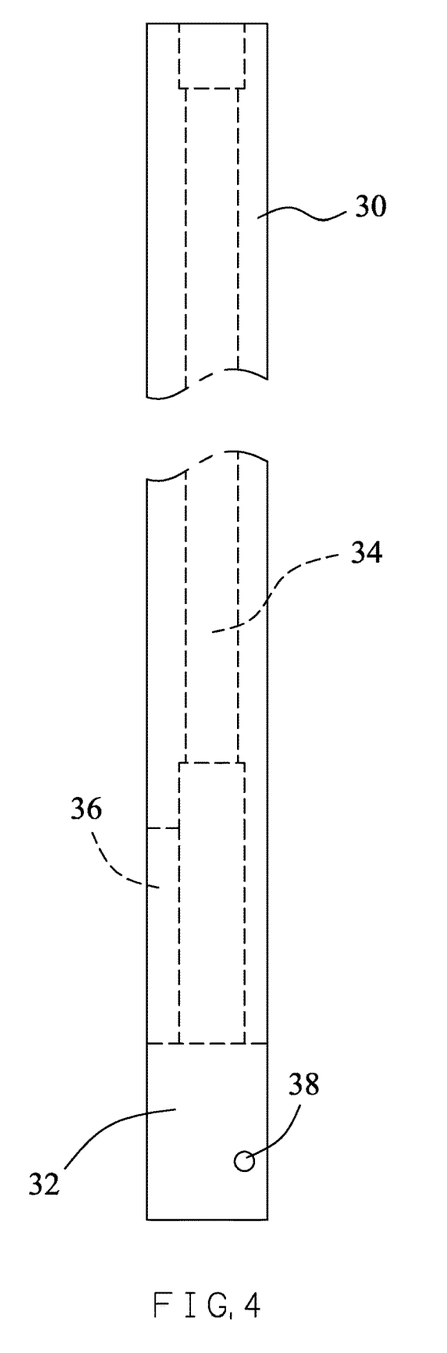
FIG. 4 is a side plan view showing the assembly of an accommodation tube of the support apparatus for the guide pin according to the preferred embodiment of the present invention.
Figure 5:
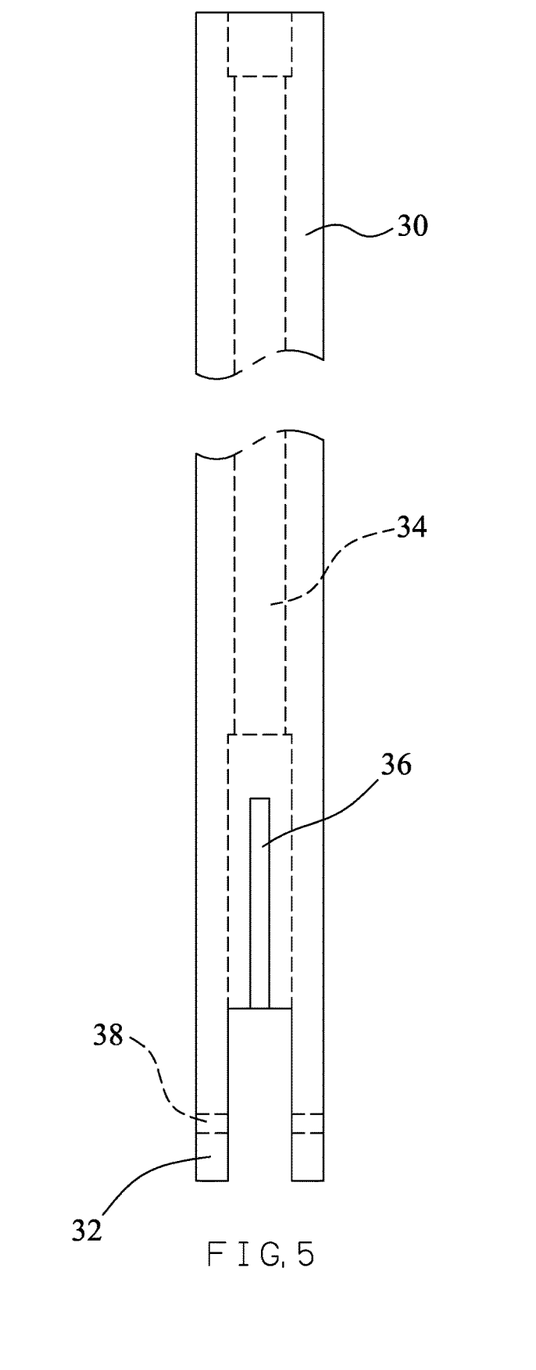
FIG. 5 is another side plan view showing the assembly of the accommodation tube of the support apparatus for the guide pin according to the preferred embodiment of the present invention.
Figure 6:
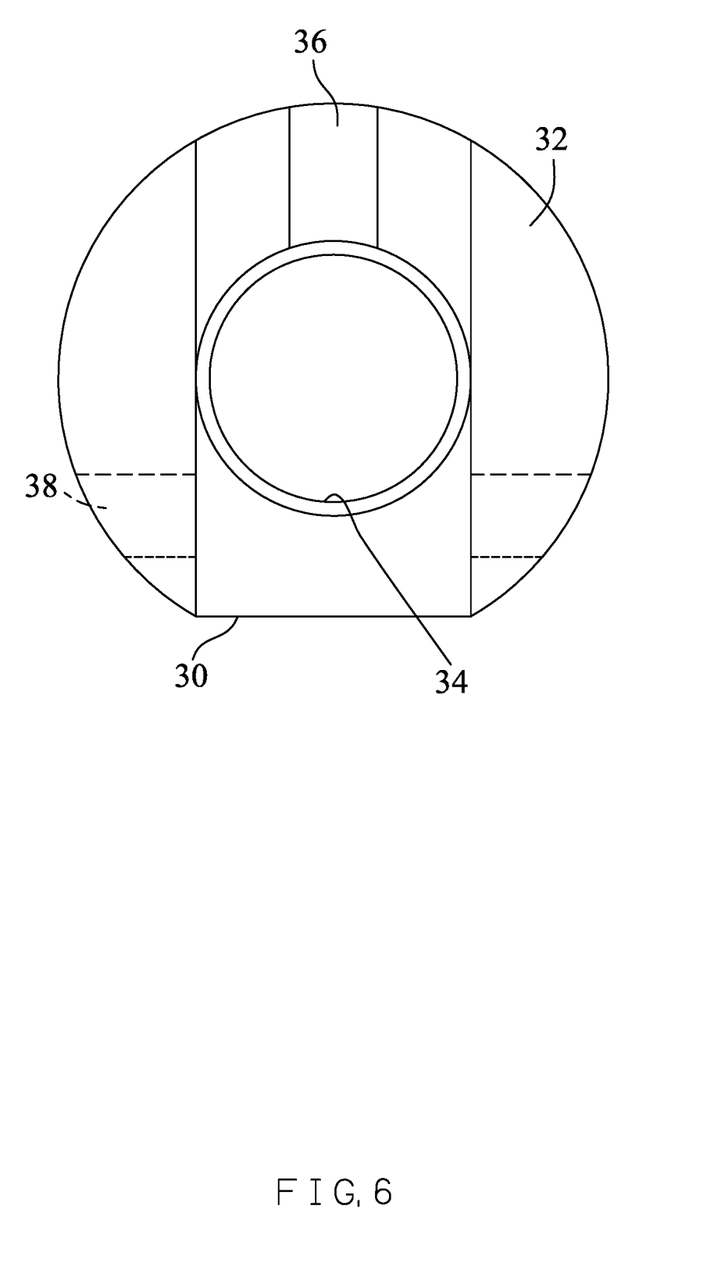
FIG. 6 is also another side plan view showing the assembly of the accommodation tube of the support apparatus for the guide pin according to the preferred embodiment of the present invention.
Figure 7:
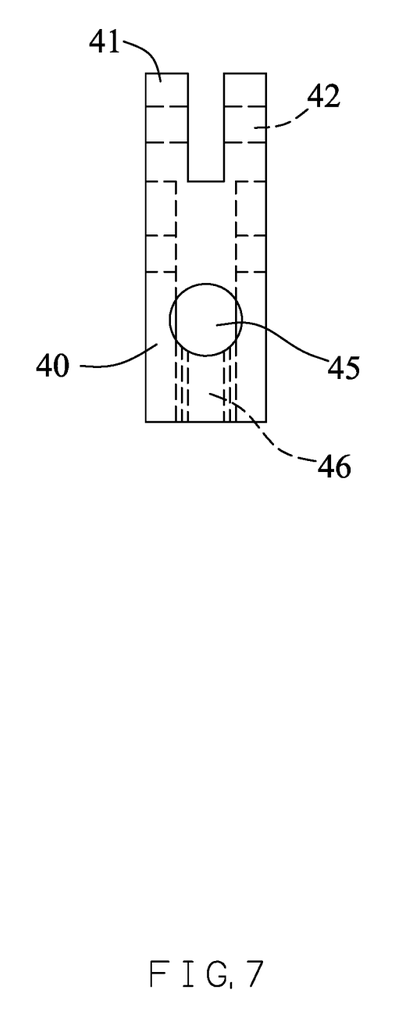
FIG. 7 is a side plan view showing the assembly of a holder of the support apparatus for the guide pin according to the preferred embodiment of the present invention.
Figure 8:
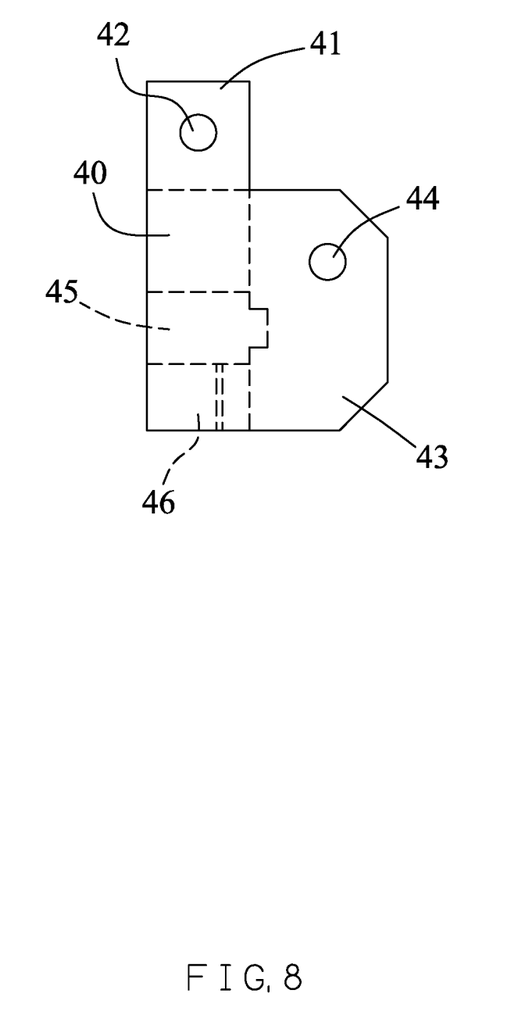
FIG. 8 is another side plan view showing the assembly of the holder of the support apparatus for the guide pin according to the preferred embodiment of the present invention.
Figure 9:
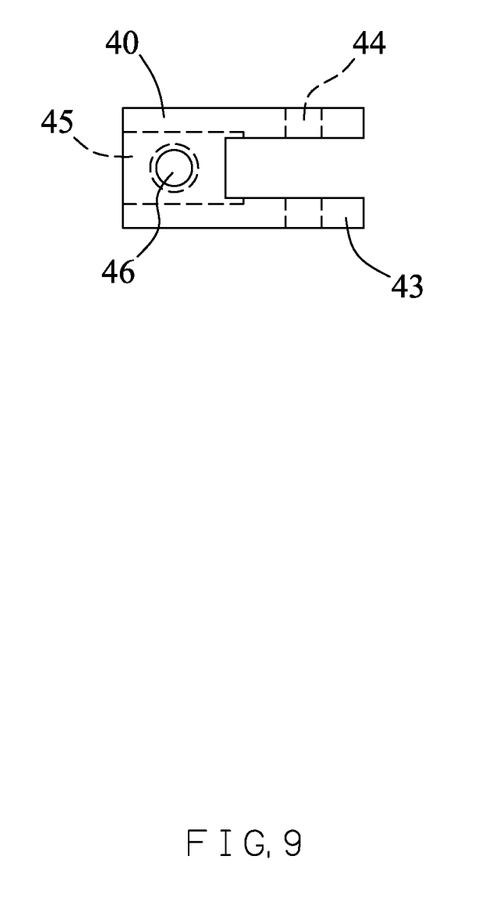
FIG. 9 is also another side plan view showing the assembly of the holder of the support apparatus for the guide pin according to the preferred embodiment of the present invention.

As shown in FIGS. 1 to 3, the upright post 20 further includes two first coupling segments 22 extending outwardly from a bottom thereof, wherein the two first coupling segments 22 are spaced apart from each other, and each first coupling segment 22 has an opening 24 formed thereon so as to accommodate each of two bolts 16, wherein said each bolt 16 does not interfere the accommodation tube 30 which inserts across the through groove 34, and said each bolt 16 does not interfere the two first coupling segments 22 which move in the accommodation tube 30.

As illustrated in FIGS. 1 and 7 to 9, the holder 40 includes two parallel joining extensions 41 extending outwardly from a top thereof, and each joining extension 41 has a first aperture 42 configured to insert through one of the two bolts 16.

The holder 40 also includes two parallel side plates 43 extending outwardly from a first peripheral side thereof adjacent to a bottom of the holder 40, wherein the two side plates 43 are separated from each other and are configured to accommodate the roller 52 therebetween, and each side plate 43 has a second aperture 44. When the connection shaft 18 inserts through the second aperture 44 of said each side plate 43, said each side plate 42 is accommodated in the fork 32, and the roller 52 is fitted with and rotates along the connection shaft 18, such that the holder 40 moves longitudinally and horizontally along the connection shaft 18 relative to the accommodation tube 30.

The holder 40 is in a rectangle shape and includes a guiding trench 45 and a threaded hole 46, wherein the guiding trench 45 passes through two sides of the holder 40 so that a part of the guide pin 58 inserts into the guiding trench 45. The guide pin 58 includes a first end extending toward the two side plates 43 and includes a second end extending out of the holder 40.

The threaded hole 46 extends to the guiding trench 45 from the bottom of the holder 40 and screws with a locking element so as to fix the holder 40 and to force the part of the guide pin 58 which inserts into the guiding trench 45, hence the guide pin 58 is fixed in the holder 40.

The locking element is a screw bolt 47 or a countersunk screw.

Figure 10:
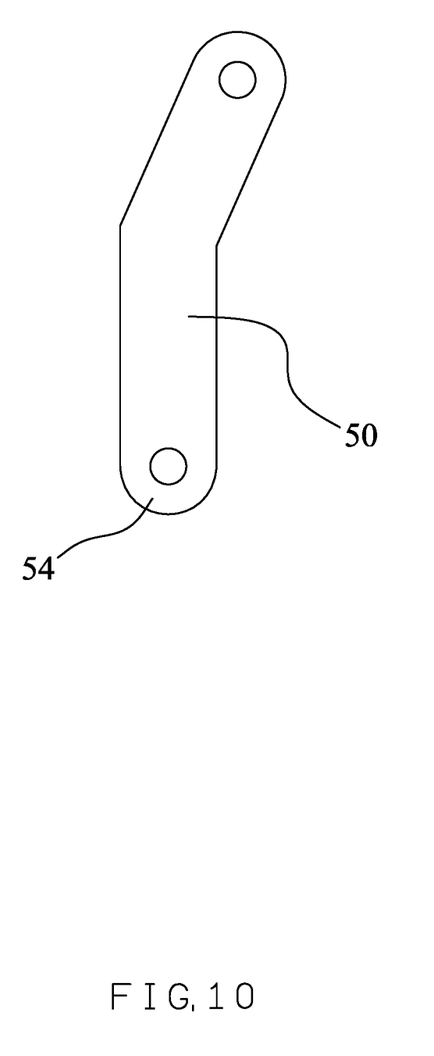
FIG. 10 is a side plan view showing the assembly of a driving mechanism of the support apparatus for the guide pin according to the preferred embodiment of the present invention.

As illustrated in FIGS. 1 and 10, the driving mechanism 50 is a bent piece and its thickness is less than a distance of the elongated slot 36, wherein the driving mechanism 50 is accommodated in and moves in elongated slot 36, and the driving mechanism 50 includes two second coupling segments 54, and each second coupling segment 54 is in a ring shape and accommodates said each bolt 16, such that the driving mechanism 50 is in connection with the two first coupling segments 22 and the two joining extensions 41 so as to drive the holder 40 to move longitudinally and horizontally relative to the accommodation tube 30 by way of the upright post 20.

Figure 11:
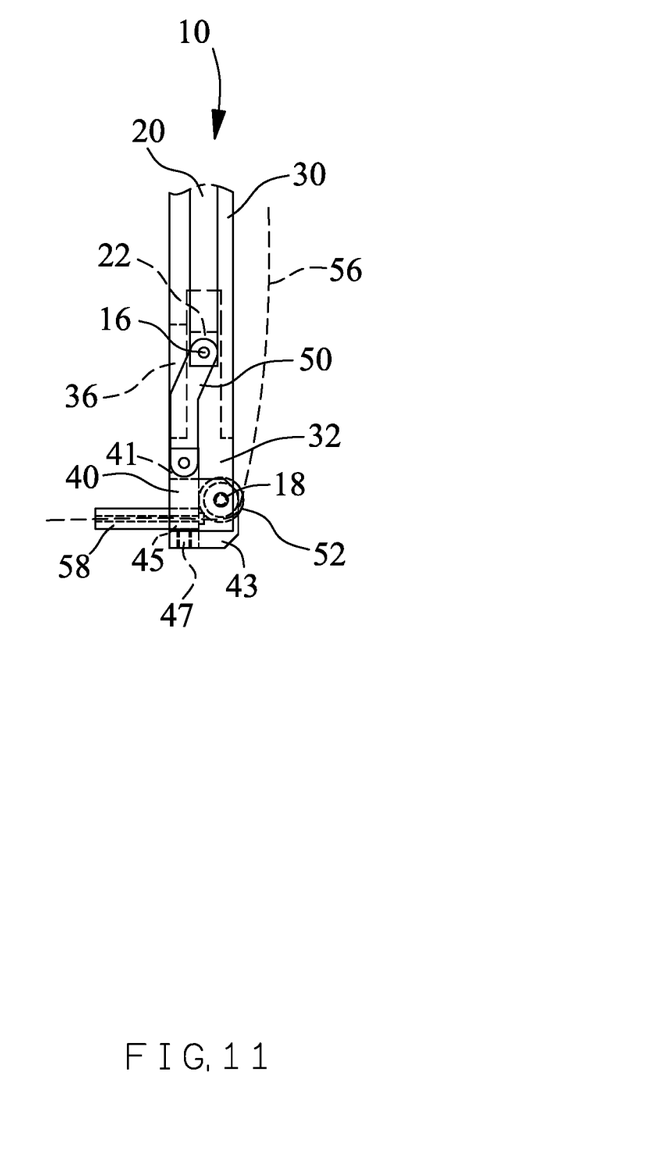
FIG. 11 is a side plan view showing the operation of the support apparatus for the guide pin according to the preferred embodiment of the present invention.

With reference to FIGS. 1 and 11, the accommodation tube 30 of the support apparatus 10 is mounted on a lifting mechanism 12, and the lifting mechanism 12 includes a housing portion 14 configured to house a metal wire 56 via the guide pin 58 from the roller 52.

The lifting mechanism 12 is arranged on a motor stator of an automatic wire winding machine (not shown) and is driven by a drive rod of an automatic control system (not shown) so as to move upwardly and downwardly, hence the support apparatus 10 winds the metal wire 56 onto the motor stator (not shown).

When the upright post 20 drives the driving mechanism 50 to move downwardly, the holder 40 is actuated by the driving mechanism 50 so as to rotate 90 degrees around the connection shaft 18, and the guide pin 58 maintains at a longitudinal position and is parallel to a length of the upright post 20.

When the upright post 20 drives the driving mechanism 50 to move upwardly, the holder 40 is actuated by the driving mechanism 50 to rotate back to an original position around the connection shaft 18, and the guide pin 58 moves to the first peripheral side of the accommodation tube 30 and is perpendicular to the length of the upright post 20, hence the metal wire 56 changes its rotation direction through the roller 52 smoothly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A support apparatus for a guide pin comprising:
   an accommodation tube including a fork extending outwardly from a bottom thereof, a through groove formed in a central position thereof and communicating with the fork, and an elongated slot defined in the through groove and communicating with the fork;
   an upright post including two first coupling segments extending outwardly from a bottom thereof and moving in the accommodation tube;
   a connection shaft passing through the fork and located on a first peripheral side of the accommodation tube opposite to a second peripheral side of the accommodation tube on which the elongated slot is defined;
   a holder including two parallel joining extensions extending outwardly from a top thereof;
   two side plates separated from each other and accommodating the connection shaft, such that the holder moves longitudinally and horizontally along the connection shaft relative to the accommodation tube;
   a guiding trench passing through two sides of the holder;
   a roller accommodated between the two side plates and rotatably fitted with the connection shaft;
   a guide pin, a part of which inserts into the guiding trench of the holder; and
   a driving mechanism accommodated and moving in the elongated slot, wherein the driving mechanism is in connection with the two first coupling segments of the upright post and with the two joining extensions of the holder so as to drive the holder to move longitudinally and horizontally relative to the accommodation tube by way of the upright post.

2. The support apparatus for the guide pin as claimed in claim 1, wherein the accommodation tube is mounted on a lifting mechanism, and the lifting mechanism includes a housing portion configured to house a metal wire via the guide pin from the roller.

3. The support apparatus for the guide pin as claimed in claim 1, wherein the guide pin is fixed in the guiding trench by a locking element which screws with the holder.

4. The support apparatus for the guide pin as claimed in claim 3, wherein the locking element is a screw bolt or a countersunk screw.

5. The support apparatus for the guide pin as claimed in claim 1, wherein the driving mechanism is a bent piece and its thickness is less than a distance of the elongated slot, and the driving mechanism includes two second coupling segments, wherein each second coupling segment is in a ring shape and accommodates said each bolt.

* * * * *